July 9, 1929.　　　C. LONGFIELD　　　1,720,420
TRAFFIC SIGNAL
Filed June 21, 1928
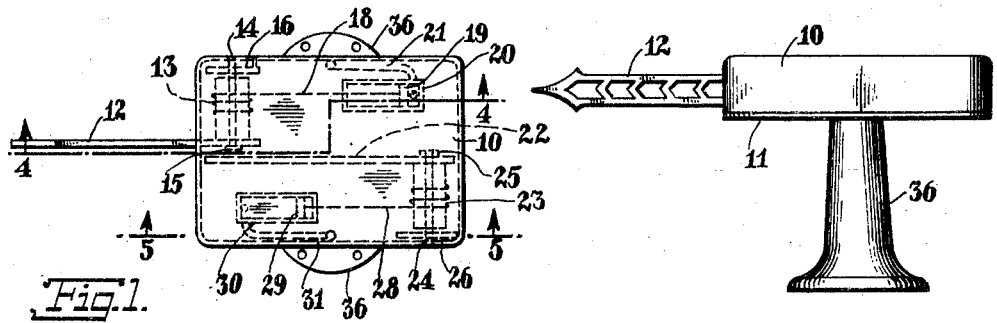
Fig.1.　　Fig.2.
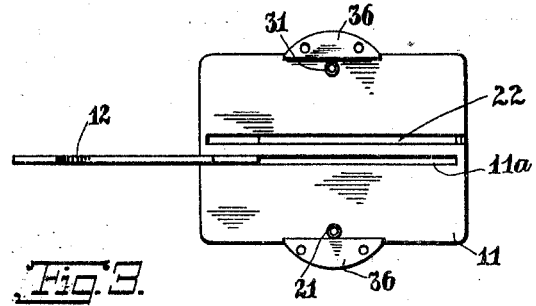
Fig.3.
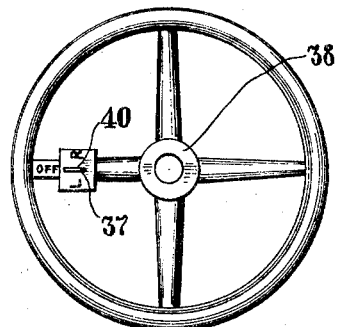
Fig.7.
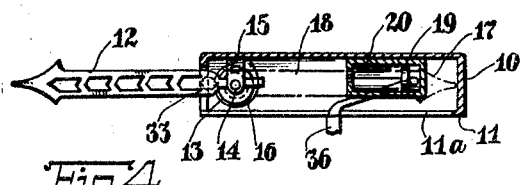
Fig.4.
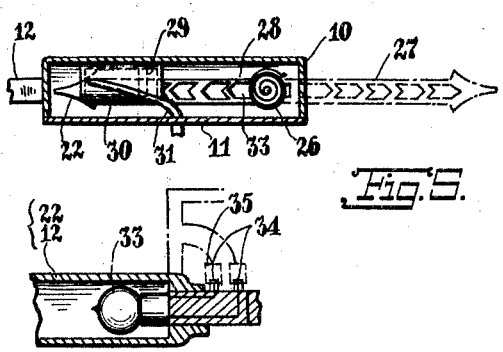
Fig.5.
Fig.6.
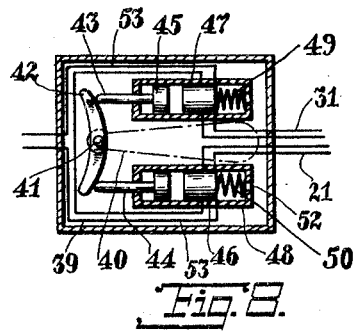
Fig.8.
INVENTOR.
Charles Longfield
BY
ATTORNEY Patented July 9, 1929.

1,720,420

UNITED STATES PATENT OFFICE.

CHARLES LONGFIELD, OF ISLIP TERRACE, NEW YORK.

TRAFFIC SIGNAL.

Application filed June 21, 1928. Serial No. 287,118.

This invention relates generally to signals and has more particular reference to a novel traffic signal for motor vehicles.

The invention has for an object the provision of a device of the class mentioned which is of simple durable construction, desirable and efficient in action, and which can be manufactured and sold at a reasonable cost.

The invention proposes the use of a casing for holding a vacuum operated signal having cylinders and pistons connected for moving semaphores from normally hidden positions to indicating positions, as determined by the operation of a valve actuating device located preferably on the steering wheel of a vehicle. The said pistons are operated by vacuum connections from the engine of the vehicle, and the said valve actuating device is adapted to normally disconnect the vacuum from the cylinders, and connect the vacuum individually with the pistons as determined by the manipulation thereof. The said casing has slots in its bottom and sides and the semaphores are pivotally mounted and arranged for normally extending in horizontal positions hid within the casing, and for swinging through the slots into horizontal operative positions extending from the casing.

The arrangement provides a positive functioning of the device from the vehicle engine action, and thus permits of simple designs of operation, which are not likely to be readily incapacitated during rough usage as for example, the vibration of the vehicle due to running.

For further comprehension of the invention, and of the objects and advantages thereof, reference will be had to the following description and accompanying drawings, and to the appended claim in which the various novel features of the invention are more particularly set forth.

In the accompanying drawing, forming a material part of this disclosure:

Fig. 1 is a plan view of a device constructed according to this invention.

Fig. 2 is a side elevational view thereof.

Fig. 3 is a bottom view thereof.

Fig. 4 is a vertical sectional view, taken on the line 4—4 of Fig. 1.

Fig. 5 is a vertical sectional view, taken on the line 5—5 of Fig. 1.

Fig. 6 is a fragmentary vertical sectional view of one of the semaphores.

Fig. 7 is a plan view of a vehicle steering wheel with a control device for operating the semaphores mounted thereon.

Fig. 8 is a horizontal sectional view of the control device per se.

The reference numeral 10 indicates generally a casing of hollow construction, closed at the bottom by a cover 11. A semaphore 12 is secured at its inner end on a drum 13 fixed on a shaft 14 rotatively mounted in the side of the casing 10 and in a standard 15 projecting from the casing 10. A spiral spring 16 acts between the casing and the drum and is arranged for normally positioning the semaphore in a horizontal position within the casing as indicated by the dot dash lines 17 in Fig. 4. A flexible member 18 is secured at one end on the drum 13 and is wound several times about the drum, and is attached at its other end on a piston 19 slidably mounted in a cylinder 20 attached to the casing 10. A pipe 21 connects with the far end of the cylinder, and upon a creation of a vacuum in this pipe, the piston 19 moves to the said far end, drawing the flexible member 18 and turning the drum 13 against the action of spring 16 for turning the semaphore from within the casing thru a slot 11$^a$ in the bottom cover and to an indicating position as shown on the drawing in full lines.

A second semaphore 22 oppositely arranged relative to semaphore 12 is secured at its inner end on a drum 23 fixed on a shaft 24 rotatively mounted in the side of the casing 10 and in a standard 25 projecting from the casing 10. A spiral spring 26 acts between the casing and the drum and is arranged for normally positioning the semaphore in a horizontal position within the casing as shown in Fig. 5. A flexible member 28 is secured at one end on the drum 23 and is wound several times about the drum, and is attached at its other end on a piston 29 slidably mounted in a cylinder 30 attached to the casing 10. A pipe 31 connects with the far end of the cylinder, and upon a creation of a vacuum in this pipe, the piston 29 moves to the said far end, for turning the semaphore 22 from within the casing to an extended position as indicated by the dot dash lines 27 in Fig. 5. The bottom cover has a second slot 11$^a$ for permitting the semaphore to move in and out of the casing.

Each of the semaphores are provided with internal lamps 33 connected by wires with contacts 34 engageable with other contacts, as indicated by dot dash lines 35, supported from the casing 10 and arranged for connecting the lamps for lighting when the semaphores are in extended positions.

The casing 10 has a pair of supporting legs 36 for attachment to a fender of a motor vehicle, and the pipes 21 and 31 run out of the casing adjacent these legs and connect with a control device 37 attached on the steering wheel 38 of a motor vehicle provided with these devices. It should be noticed that a driver may hold the wheel 38 with both hands and may easily operate the control device with one of his fingers.

The valve actuating device 37 consists of a casing 39 with an operating handle 40 on the top thereof. The central position of this handle indicates an off position of the device, and then the handle may be turned to the right or the left for "on" positions.

The handle 40 is fixed on a shaft 41 extending into the casing, and a cam lever 42 is fixed intermediate of its ends on this shaft. Pressing against the ends of the cam lever 42 are rods 43, 44 connected respectively with valves 45, 46 slidably in cylinders 47, 48 secured within the casing 39. Springs 49, 50 normally hold the valves depressed, and the pipes 31, 21 connect with the cylinders so as to have free air connections to the atmosphere by reason of apertures 51, 52 in the cylinders. Pipes 53 connect with the vacuum in the vehicle engine and with the cylinders 47, 48 so as to be normally shut off by the valves 45, 46. The springs 49, 50 act to hold the cam lever 42 in a neutral position, and thus hold the handle 40 in a central "off" position.

When the handle 40 is turned towards the right, valve 45 will be raised and is then arranged for connecting pipe 53 with pipe 31 for operating semaphore 22 as before described. When the handle 40 is turned towards the left, valve 46 will be raised and is arranged for then connecting pipe 53 with pipe 21 for operating semaphore 12.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention what I claim as new and desire to secure by United States Letters Patent is:

In a traffic signal, a hollow casing with a closed bottom having slots therein communicating with the interior and exterior of the casing and extending up the sides of the casing, and semaphores pivotally mounted on the casing and arranged for normally extending in horizontal positions hid within the casing, and for swinging thru the said slots into horizontal operative positions extending from the casing.

In testimony whereof I have affixed my signature.

CHARLES LONGFIELD.